(12) United States Patent
Kinouchi

(10) Patent No.: US 7,930,081 B2
(45) Date of Patent: Apr. 19, 2011

(54) ELECTRONIC APPARATUS AND ELECTRONIC APPARATUS CONTROL METHOD

(75) Inventor: Takashi Kinouchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1035 days.

(21) Appl. No.: 11/584,674

(22) Filed: Oct. 23, 2006

(65) Prior Publication Data

US 2007/0110407 A1 May 17, 2007

(30) Foreign Application Priority Data

Oct. 26, 2005 (JP) ................................. 2005-311400

(51) Int. Cl.
*G06F 13/28* (2006.01)
(52) U.S. Cl. ............. 701/45; 386/125; 360/75; 711/112
(58) Field of Classification Search .................. 386/125; 701/45; 711/122
See application file for complete search history.

(56) References Cited

U.S. PATENT DOCUMENTS

| | | | | | |
|---|---|---|---|---|---|
| 2,913,171 | A | * | 11/1959 | Phelps et al. ..................... | 360/69 |
| 3,864,661 | A | * | 2/1975 | Ranalli ........................ | 367/11 |
| 3,944,979 | A | * | 3/1976 | Kwok ........................... | 382/274 |
| 4,215,368 | A | * | 7/1980 | Flory et al. .................... | 348/176 |
| 4,319,332 | A | * | 3/1982 | Mehnert ....................... | 342/27 |
| 4,461,401 | A | * | 7/1984 | Sasnett, Jr. ..................... | 222/27 |
| 4,501,170 | A | * | 2/1985 | Muller et al. ................... | 477/94 |
| 4,595,281 | A | * | 6/1986 | Oushiden et al. ............... | 355/51 |
| 4,627,011 | A | * | 12/1986 | Spencer et al. ................. | 701/70 |
| 4,712,195 | A | * | 12/1987 | Finger .......................... | 365/226 |
| 4,839,755 | A | * | 6/1989 | Yamada et al. ................ | 714/755 |
| 5,022,088 | A | * | 6/1991 | Hisada et al. .................. | 382/235 |
| 5,056,056 | A | * | 10/1991 | Gustin ......................... | 702/187 |
| 5,862,272 | A | * | 1/1999 | Ishiguro et al. ............... | 382/312 |
| 5,870,502 | A | * | 2/1999 | Bonneau et al. ............. | 382/249 |
| 6,037,946 | A | * | 3/2000 | Takeda ......................... | 345/422 |
| 6,453,266 | B1 | * | 9/2002 | Chainer et al. ................ | 702/184 |
| 6,580,574 | B1 | | 6/2003 | Codilian | |
| 6,603,620 | B1 | | 8/2003 | Berding | |
| 6,758,845 | B1 | * | 7/2004 | Weckwerth et al. .............. | 606/9 |
| 7,104,944 | B2 | * | 9/2006 | Fujimaki et al. ................ | 494/10 |
| 2001/0007469 | A1 | * | 7/2001 | Fuchimukai et al. ......... | 348/208 |

(Continued)

FOREIGN PATENT DOCUMENTS

JP 02088932 A * 3/1990

(Continued)

OTHER PUBLICATIONS

U.S. Appl. No. 11/416,121, filed May 3, 2006, Kinouchi, et al.

*Primary Examiner* — Khoi Tran
*Assistant Examiner* — Kyung J Kim
(74) *Attorney, Agent, or Firm* — Oblon, Spivak, McClelland, Maier & Neustadt, L.L.P.

(57) ABSTRACT

An electronic apparatus includes: a recording unit configured to access a recording medium using a head; an acceleration sensor that detects acceleration generated in the electronic apparatus; and a control unit configured to write, in the recording medium or a predetermined memory, detection data indicating a result of the detection by the acceleration sensor or a state of the electronic apparatus detected on the basis of the detection result and retracting, when the detection result satisfies a drop condition for the electronic apparatus defined in advance, the head of the recording unit to a predetermined retraction position.

20 Claims, 6 Drawing Sheets

U.S. PATENT DOCUMENTS

| | | | |
|---|---|---|---|
| 2002/0164855 A1* | 11/2002 | Pan et al. | 438/257 |
| 2003/0067705 A1 | 4/2003 | Ishiyama et al. | |
| 2003/0225497 A1* | 12/2003 | Whinnery | 701/49 |
| 2004/0252403 A1 | 12/2004 | Wehrenberg | |
| 2005/0088773 A1* | 4/2005 | Yoshida | 360/75 |
| 2005/0141127 A1* | 6/2005 | Shimotono et al. | 360/75 |
| 2005/0190389 A1* | 9/2005 | Tanaka | 358/1.9 |
| 2005/0235385 A1 | 10/2005 | Wehrenberg | |
| 2005/0273170 A1* | 12/2005 | Navarro et al. | 623/17.13 |
| 2006/0274053 A1 | 12/2006 | Kinouchi | |
| 2007/0005617 A1 | 1/2007 | Kinouchi | |
| 2007/0016739 A1* | 1/2007 | Na | 711/158 |
| 2007/0027926 A1 | 2/2007 | Kinouchi et al. | |
| 2007/0110053 A1* | 5/2007 | Soni et al. | 370/389 |

FOREIGN PATENT DOCUMENTS

| | | |
|---|---|---|
| JP | 02088933 A * | 3/1990 |
| JP | 11-203770 | 7/1999 |
| JP | 2005-11474 | 1/2005 |
| JP | 2005-37300 | 2/2005 |
| JP | 2005-190641 | 7/2005 |
| JP | 2005-241503 | 9/2005 |
| WO | WO 02/29812 A2 | 4/2002 |

* cited by examiner

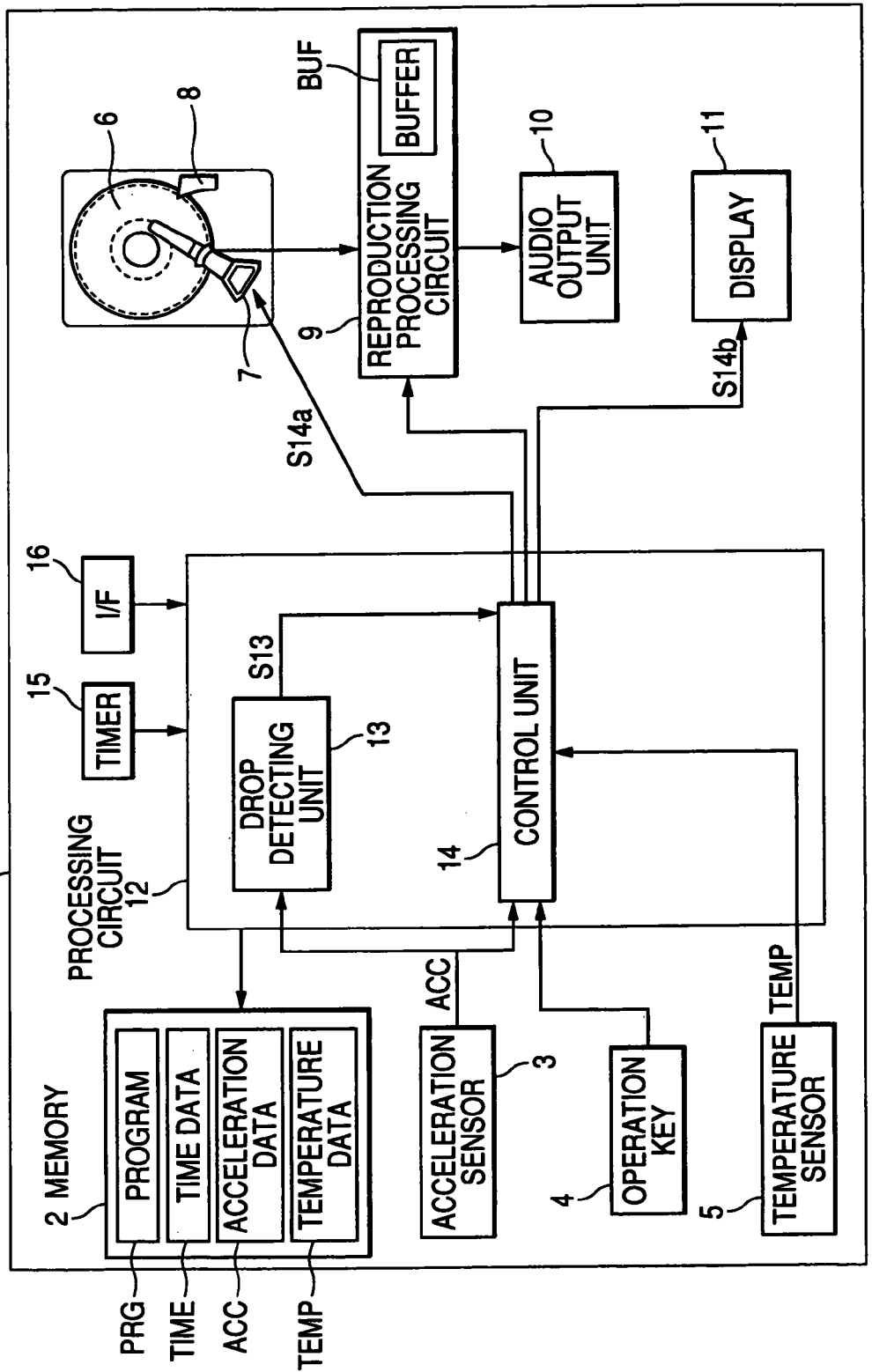

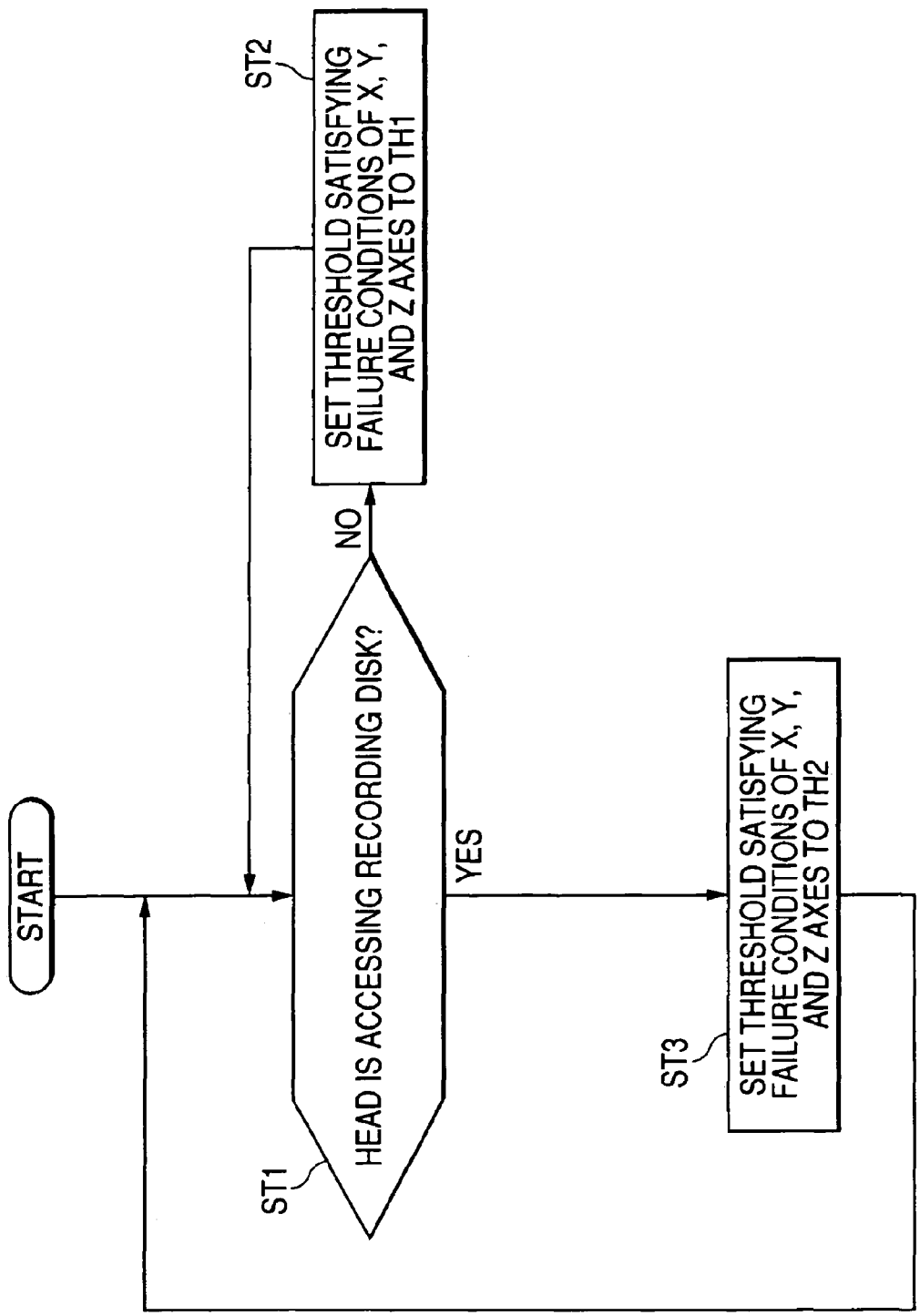

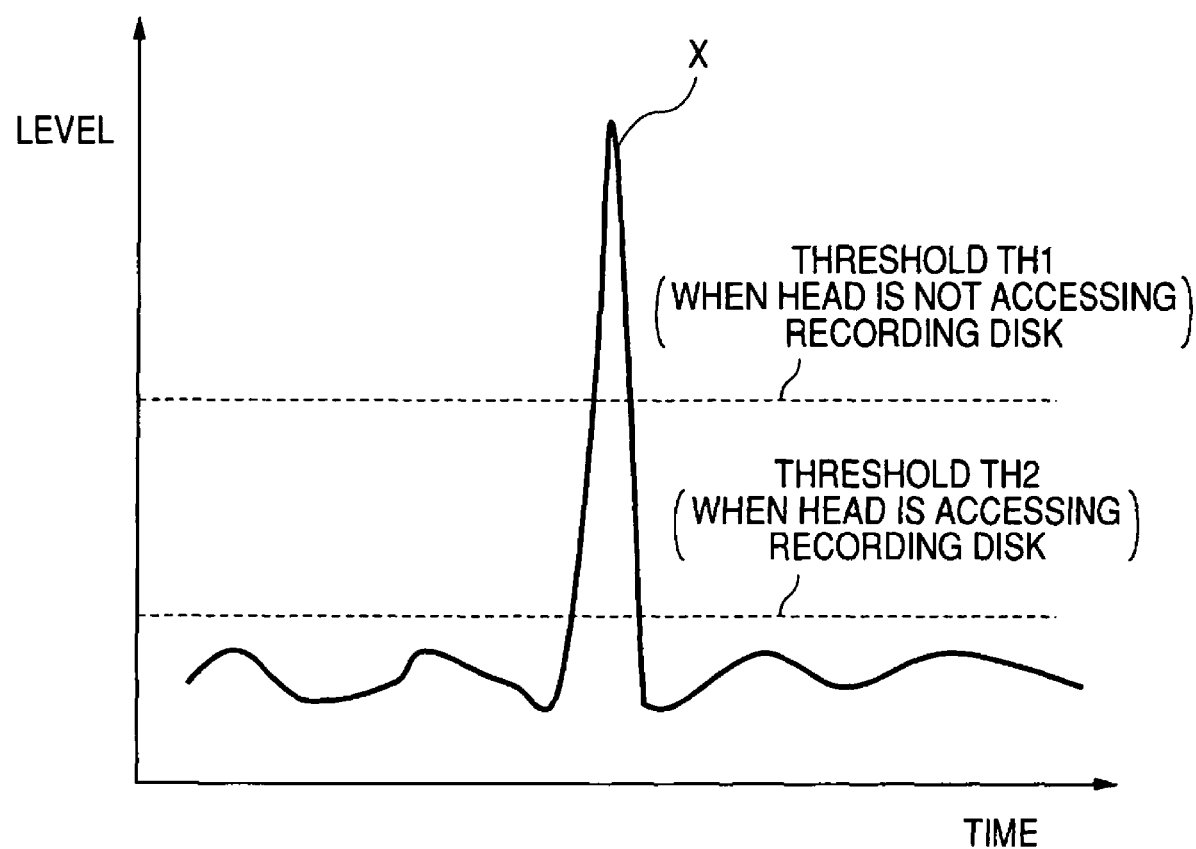

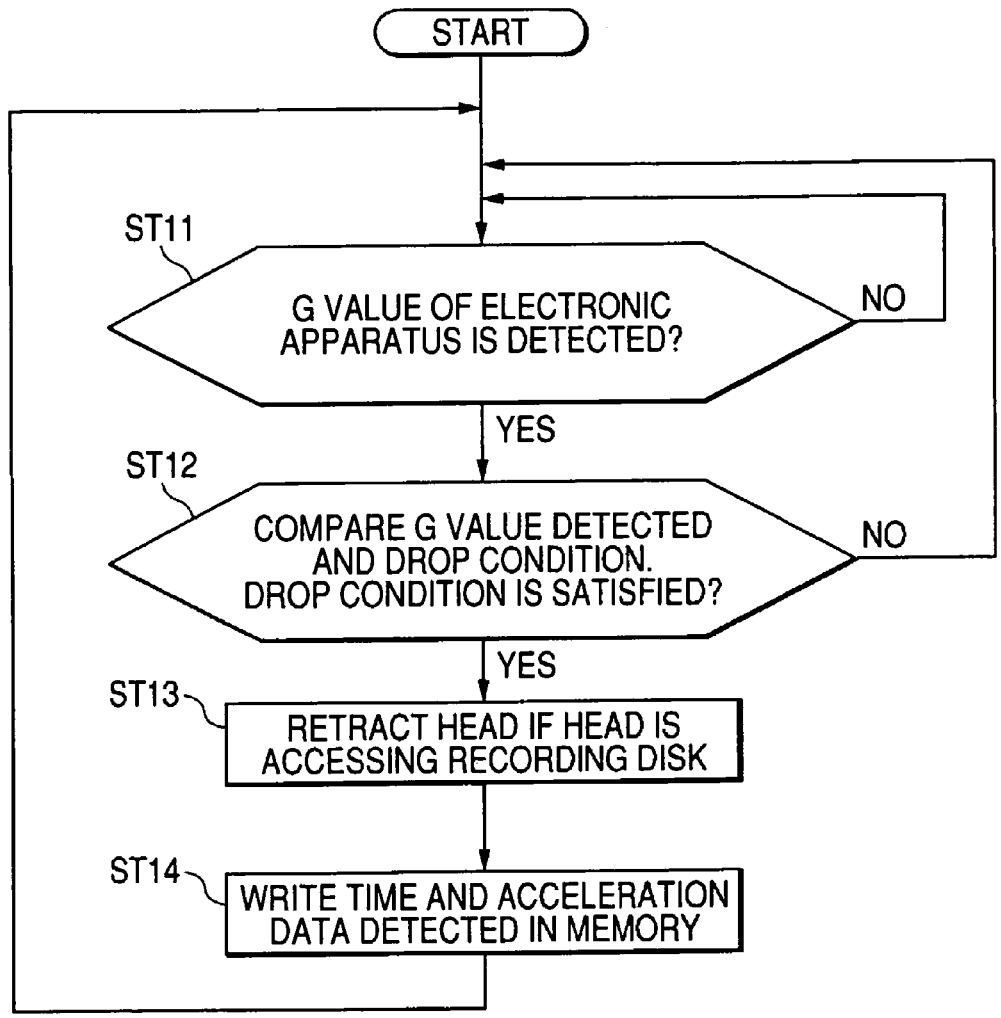

| TIME DATA TIME | TEMPERATURE DATA TEMP |
|---|---|
| 4:8:58 ON AUGUST 12, 2005 | 80°C |
| 16:45:06 ON AUGUST 13, 2005 | 55°C |
| ... | ... |
| | |
| | |

ELECTRONIC APPARATUS AND ELECTRONIC APPARATUS CONTROL METHOD

CROSS-REFERENCES TO RELATED APPLICATIONS

This application contains subject matter related to Japanese Patent Application JP 2005-311400 filed in the Japanese Patent Office on Oct. 26, 2005, the entire contents of which being incorporated herein by reference.

BACKGROUND OF THE INVENTION

1. Field of the Invention

The present invention relates to an electronic apparatus including an acceleration sensor for drop detection and an electronic apparatus control method.

2. Description of the Related Art

For example, according to a reduction in size of an HDD (Hard Disk Drive), the HDD is mounted on a portable electronic apparatus such as a portable music player.

Since such a portable electronic apparatus is often carried by a user, the portable electronic apparatus is likely to drop. Therefore, the portable electronic apparatus mounted with the HDD includes an acceleration sensor for drop detection and performs an operation for retracting a head of the HDD when the acceleration censor detects a drop start state (see, for example, JP-A-2005-11474).

SUMMARY OF THE INVENTION

When a repairer repairs a broken-down portable electronic apparatus, first, it is necessary to specify a location of failure. The location of failure is estimated with reference to a state of use or the like of the portable electronic apparatus by a user. However, the state of use or the like alone is often insufficient as information.

Therefore, it is not uncommon for the repairer to spend a long time to specify the location of failure.

Thus, it is desirable to provide an electronic apparatus and an electronic apparatus control method that are capable of easily specifying a cause of failure and a location of failure.

According to an embodiment of the invention, there is provided an electronic apparatus including: a recording unit configured to access a recording medium using a head; an acceleration sensor that detects acceleration generated in the electronic apparatus; and a control unit configured to write, in the recording medium or a predetermined memory, detection data indicating a result of the detection by the acceleration sensor or a state of the electronic apparatus detected on the basis of the detection result and retracting, when the detection result satisfies a drop condition for the electronic apparatus defined in advance, the head of the recording unit to a predetermined retraction position.

According to another embodiment of the invention, there is provided an electronic apparatus control method for controlling a portable electronic apparatus including recording means for accessing a recording medium using a head and an acceleration sensor that detects acceleration. The electronic apparatus control method includes: a first step of generating detection data indicating a result of the detection by the acceleration sensor or a state of the electronic apparatus detected on the basis of the detection result; a second step of writing the detection data generated in the first step in a predetermined memory; and a third step of retracting, when the detection result satisfies a drop condition for the electronic apparatus defined in advance, the head of the recording means to a predetermined retraction position.

According to an embodiment of the invention, it is possible to provide an electronic apparatus and an electronic apparatus control method that are capable of easily specifying a cause of failure and a location of failure and provide an electronic apparatus and an electronic apparatus control method that are capable of easily specifying a location of failure.

BRIEF DESCRIPTION OF THE DRAWINGS

In the accompanying drawings:

FIG. 1 is an overall diagram of a portable music player according to an embodiment of the invention;

FIG. 2 is a flowchart for explaining a method of setting a threshold for X, Y, and Z used by the portable music player to judge whether detection data such as acceleration data ACC should be written in a memory 2;

FIG. 3 is a graph for explaining a method of setting the thresholds shown in FIG. 2;

FIG. 4 is a flowchart for explaining operations performed when the portable music player shown in FIG. 1 has dropped;

FIG. 5 is a table for explaining detection data written in the memory 2 in the operations shown in FIG. 4;

DESCRIPTION OF THE PREFERRED EMBODIMENTS

Figures 6, 7:
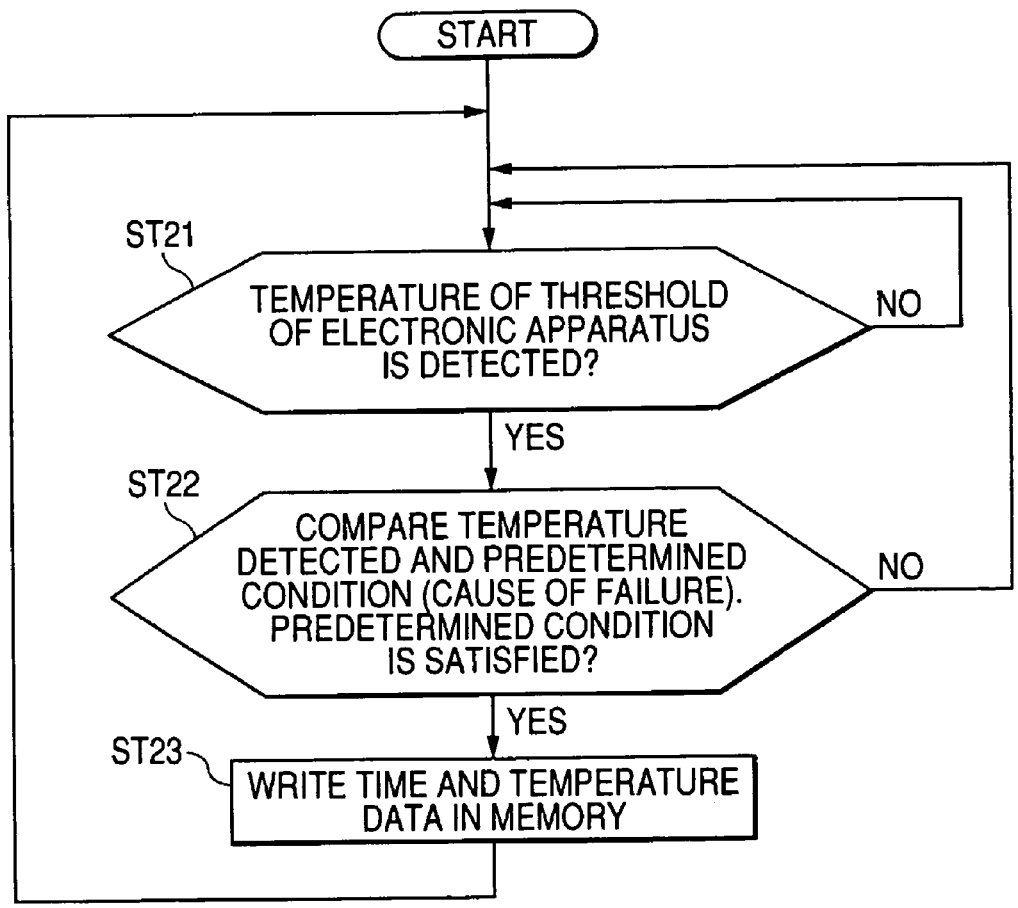
FIG. 6 is a flowchart for explaining operations in storing temperature data, which indicates a temperature in a housing of the portable music player shown in FIG. 1, in the memory 2 as detection data.
FIG. 7 is a table for explaining the detection data written in the memory 2 in the operations shown in FIG. 6.

An embodiment of the invention will be hereinafter explained with reference to the drawings.

FIG. 1 is an overall diagram of a portable music player 1 that is an example of an electronic apparatus according to an embodiment of the invention.

As shown in the figure, the portable music player 1 includes, for example, a memory 2, an acceleration sensor 3, an operation key 4, a temperature sensor 5, a recording disk 6, a header 7, a reproduction processing circuit 9, an audio output unit 10, a display 11, a processing circuit 12, a timer 15, and an interface 16.

The memory 2 is an example of a predetermined memory according to the embodiment of the invention. The temperature sensor 5 is an example of a temperature sensor according to the embodiment of the invention. The acceleration sensor 3 is an example of an acceleration sensor according to the embodiment of the invention. The processing circuit 12 is an example of a control unit or control means according to the embodiment of the invention. The recording disk 6 is an example of a recording unit or recording means according to the embodiment of the invention. The head 7 is an example of a head according to the embodiment of the invention.

As shown in FIG. 1, the memory 2 stores a program PRG, time data TIME, acceleration data ACC, and temperature data TEMP.

The time data TIME, the acceleration data ACC, and the temperature data TEMP are written in the memory 2 according to operations of the processing circuit 12 described later.

Detection data such as the time data TIME, the acceleration data ACC, and the temperature data TEMP written in the memory 2 are read out at the time of repair of the portable music player 1 and used for specifying a cause of failure of the portable music player 1.

The acceleration sensor 3 is disposed in a housing of the portable music player 1. The acceleration sensor 3 detects accelerations in three axial directions (X, Y, and Z direction) generated in the portable music player 1 and outputs acceleration data indicating the accelerations to a control unit 14. When at least the acceleration in one axial direction of the accelerations in the three axial directions exceeds a predetermined level, the control unit 14 writes detection data in the memory 2. The control unit 14 may write detection data in the memory 2 when combined acceleration of the accelerations in the three axial directions exceeds the predetermined level.

The operation key 4 is constituted by plural keys disposed on the surface of the housing of the portable music player 1. The operation key 4 outputs an operation signal corresponding to the operation of a user to the control unit 14 of the processing circuit 12 shown in FIG. 1.

The temperature sensor 5 is disposed in the housing of the portable music player 1. The temperature sensor 5 detects temperature in the housing and outputs temperature data TEMP, which is a result of the detection, to the control unit 4.

The timer 15 counts time and outputs time data TIME indicating a value of the count to the control unit 14.

The interface 16 is an interface used for, for example, outputting the detection data stored in the memory 2 to the outside of the portable music player 1.

The interface 16 outputs detection data such as the time data TIME, the acceleration data ACC, and the temperature data TEMP stored in the memory 2 to the out side of the portable music player 1 at the time of repair of the portable music player 1.

The display 11 displays a screen corresponding to a display signal S14b from the processing circuit 12. The screen is an operation screen such as a music selection screen for selecting content (music data, etc.) to be played, a play screen, or a menu screen.

The display 11 displays, for example, at the time of repair of the portable music player 1, the detection data such as the time data TIME, the acceleration data ACC, and the temperature data TEMP stored in the memory 2.

The recording disk 6 is a recording medium such as a hard disk. The recording disk 6 records content data such as music data.

The head 7 reads out the content data from the recording disk 6 and outputs the content data to the reproduction processing circuit 9.

The head 7 moves from a head retracting section 8 toward the recording disk 6 when the head 7 accesses the recording disk 6.

The head 7 is held by the head retracting section 8 in a state in which the head 7 does not access the recording disk 6. In the head retracting section 8, since the head 7 is fixed, the head 7 does not damage a recording area of the recording disk 6 even if an impact is applied to the portable music player 1.

The head 7 reads out, according to control by a not-shown control mechanism, music data from a designated address in the recording disk 6 on the basis of a control signal S14a from the control unit 14 and outputs the music data to the reproduction processing circuit 9.

The reproduction processing circuit 9 performs reproduction processing for the content data read out from the recording disk 6 by the head 7 and outputs a reproduction signal to an audio output unit 10.

The reproduction processing circuit 9 includes a buffer memory BUF and stores the content data read out from the recording disk 6 in advance in the buffer memory BUF. The reproduction processing circuit 9 reads out the content data from the buffer memory BUF, subjects the content data to reproduction processing, and outputs the content data to the audio output unit 10.

The processing circuit 12 executes the program PRG read out from the memory 2 and controls operations of the portable music player 1.

As shown in FIG. 1, the processing circuit 12 includes a drop detecting unit 13 and the control unit 14.

The respective components of the processing circuit 12 may be realized as electronic circuits, respectively or may be realized by a CPU (Central Processing Unit) realizing the program PRG read out from the memory 2.

[Drop Detecting Unit 13]

The drop detecting unit 13 judges, on the basis of the acceleration data ACC inputted from the acceleration sensor 3, whether the portable music player 1 has dropped. When it is judged that the portable music player 1 has dropped, the drop detecting unit 13 outputs a drop detection signal S13 to the control unit 14 shown in FIG. 1.

The drop detecting unit 13 outputs, for example, when combined acceleration of accelerations in the three axial directions indicated by the acceleration data ACC exceeds the predetermined level, the drop detection signal S13, which indicates that the portable music player 1 has dropped, to the control unit 14.

[Control Unit 14]

The control unit 14 shown in FIG. 1 performs predetermined processing on the basis of an operation signal inputted from the operation key 4.

The control unit 14 performs control of an operation screen displayed on the display 11, readout control for music data from the recording disk 6 by the head 7, processing for writing the detection data such as the time data TIME, the acceleration data ACC, and the temperature data TEMP in the memory 2, and the like.

The control unit 14 performs processing for reading out, for example, when a predetermined command defined in advance is inputted via the operation unit 4, the detection data such as the time data TIME, the acceleration data ACC, and the temperature data TEMP stored in the memory 2 from the memory 2 and displaying the detection data on the display 11 or outputting the detection data to the outside from the interface 16.

The control unit 14 retracts the head 7 to the head retracting section 8 when the drop detection signal S13, which indicates that the portable music player 1 has dropped, is inputted from the drop detecting unit 13.

Examples of operations of the portable music player 1 will be hereinafter explained.

FIRST OPERATION EXAMPLE

In the operation example, a method of setting a threshold used by the portable music player 1 to judge whether the detection data such as the acceleration data ACC should be written in the memory 2 will be explained.

FIG. 2 is a flowchart for explaining the operation example.

Step ST1

The control unit 14 judges whether the head 7 is accessing the recording disk 6. When the head 7 is accessing the recording disk 6, the control unit 14 proceeds to step ST3. When the head 7 is not accessing the recording disk 6, the control unit 14 proceeds to step ST2.

Step ST2

The control unit 14 sets "th1" shown in FIG. 3 as a threshold used for judgment on whether the detection data should be stored in the memory 2.

Step ST3

The control unit 14 sets "th2" shown in FIG. 3 as the threshold. Note that "th2" is smaller than "th1".

In this embodiment, as described above, when the head 7 is accessing the recording disk 6, as the threshold used for judgment on whether the detection data should be stored in the memory 2, a threshold smaller than that set when the head 7 is not accessing the recording disk 6 is set. This makes it possible to write, during head access in which the head 7 tends to collide against the recording disk 6 to cause a damage, the detection data in the memory 2 even when acceleration smaller than that at the time when the head 7 is not accessing the recording disk 6 is generated.

SECOND OPERATION EXAMPLE

In the operation example, operations performed when the portable music player 1 has dropped will be explained.

FIG. 4 is a flowchart for explaining the operation example.

Step ST11

The control unit 14 judges whether the acceleration data ACC is inputted from the acceleration sensor 3. When it is judged that the acceleration data ACC is inputted, the control unit 14 proceeds to step ST12. When it is judged that the acceleration data ACC is not inputted, the control unit 14 repeats the judgment.

Step ST12

The control unit 14 compares the acceleration data ACC inputted instep ST11 and a predetermined drop condition. When the drop condition is satisfied (e.g., when the acceleration data ACC exceeds the predetermined level), the control unit 14 proceeds to step ST13. When the drop condition is not satisfied, the control unit 14 returns to step ST11.

Step ST13

The control unit 14 retracts the head 7 to the head retracting section 8 when the head 7 is accessing the recording disk 6.

Step ST14

As shown in FIG. 5, the control unit 14 writes (additionally writes), in the memory 2, acceleration data ACC in a fixed period (e.g., three seconds) after the acceleration data ACC is inputted in step ST11 and time data TIME at the time of acquisition of the acceleration data ACC in association with each other as detection data.

In step ST14, the control unit 14 may store in the memory 2 only maximum acceleration data ACC of the acceleration data ACC in the fixed period after the acceleration data ACC is inputted in step ST11.

In the example shown in FIG. 5, detection data including an entry indicating that acceleration of "65. 5G" was generated in the portable music player 1 at "22:45:37 on Aug. 10, 2005" and an entry indicating that acceleration of "72.1G" was generated in the portable music player 1 at "10:08:25 on Aug. 11, 2005" is stored in the memory 2.

The detection data is read out from the memory 2 and used for specifying a cause (a location) of failure at the time of repair of the portable music player 1.

THIRD OPERATION EXAMPLE

In the operation example, operations in storing temperature data, which indicates temperature in the housing of the portable music player 1, in the memory 2 as detection data will be explained.

FIG. 6 is a flowchart for explaining the operation example.

Step ST21

The control unit 14 judges whether the temperature data TEMP is inputted from the temperature sensor 5. When it is judged that the temperature data TEMP is inputted, the control unit 14 proceeds to step ST22. When it is judged that the temperature data TEMP is not inputted, the control unit 14 repeats the judgment.

Step ST22

The control unit 14 compares the temperature data inputted in step ST21 and a predetermined condition (a predetermined temperature) and checks whether the predetermined condition is satisfied. When the predetermined condition is satisfied, the control unit 14 proceeds to step ST23. When the predetermined condition is not satisfied, the control unit 14 proceeds to step ST23. When the predetermined condition is not satisfied, the control unit 14 returns to step ST21.

Step ST23

The control unit 14 writes (additionally writes), in the memory 2, the temperature data TEMP inputted in step ST21 and time data TIME at the time of acquisition of the temperature data TEMP in association with each other as detection data.

In the example shown in FIG. 7, detection data including an entry indicating that temperature in the housing of the portable music player 1 rose to "80°C." at "04:08:58 on Aug. 12, 2005" and an entry indicating that temperature in the housing of the portable music player 1 rose to "55° C." at "16:45:06 on Aug. 13, 2005" is stored in the memory 2.

The detection data is read out from the memory 2 and used for specification of a cause (a location) of failure at the time of repair of the portable music player 1.

FOURTH OPERATION EXAMPLE

In the operation example, operations in reading out the detection data stored in the memory 2, for example, at the time of repair of the portable music player 1 will be explained.

Figure 8:
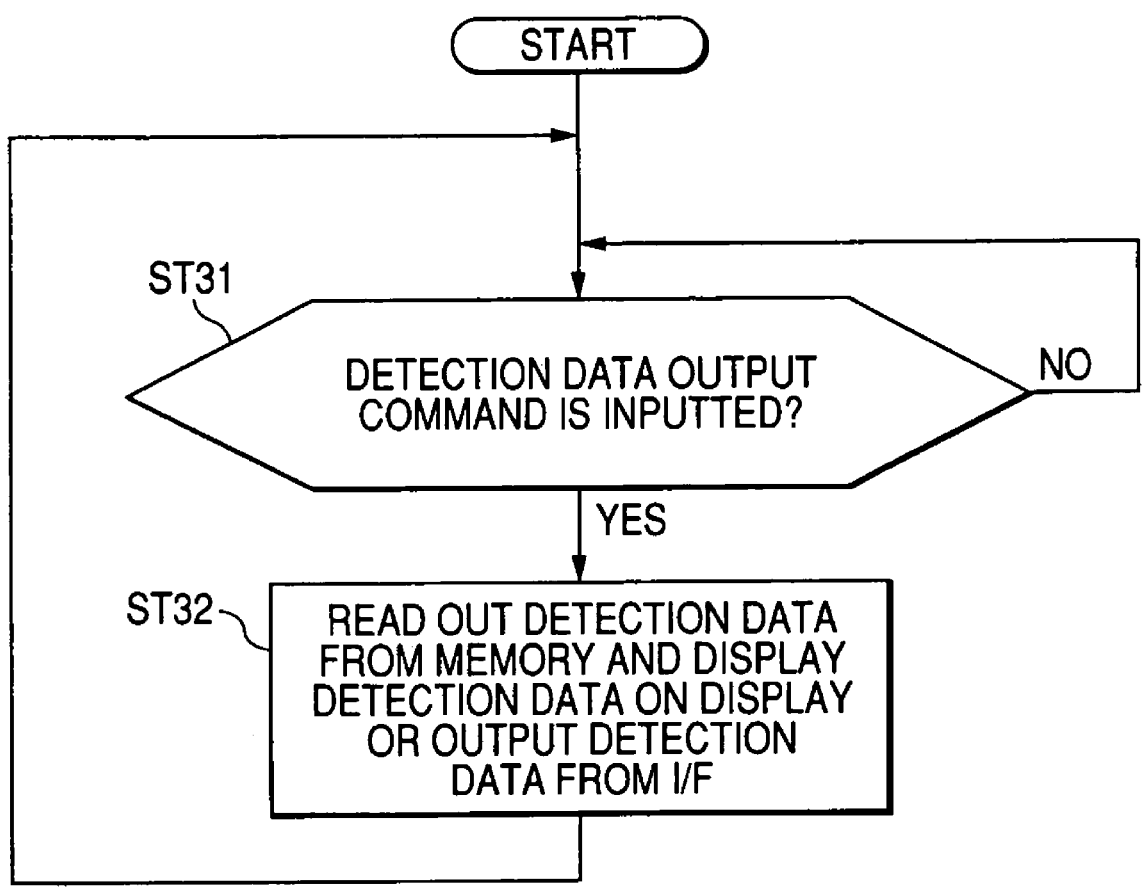
FIG. 8 is a flowchart for explaining operations in reading out the detection data stored in the memory 2 when the portable music player shown in FIG. 1 is repaired.

FIG. 8 is a flowchart for explaining the operation example.

Step ST31

The control unit 14 judges, on the basis of an operation signal from the operation key 4, whether a detection data output command is inputted. When it is judged that the detection data output command is inputted, the control unit 14 proceeds to step ST32. When it is judged that the detection data output command is not inputted, the control unit 14 repeats the judgment.

Step ST32

The control unit 14 reads out the detection data shown in FIG. 5, FIG. 7, or the like stored in the memory 2. The control unit 14 displays the detection data on the display 11 or outputs the detection data to the outside of the portable music player 1 via the interface 16.

A repairer of the portable music player 1 estimates a cause of failure and a location of failure of the portable music player 1 on the basis of the detection data.

As explained above, in the portable music player 1, when the acceleration data ACC and the temperature data TEMP satisfies the conditions that can be a cause of failure of the portable music player 1, the acceleration data ACC and the temperature data TEMP are stored in the memory 2 as detection data.

AT the time of repair of the portable music player 1, by reading out the detection data from the memory 2, it is possible to estimate a location of failure and a cause of failure of the portable music player 1 on the basis of the detection data. This makes it possible to make repair work for the portable music player 1 efficient.

The invention is not limited to the embodiment described above.

In the embodiment described above, the portable music player 1 is described as an example of the electronic apparatus according to the embodiment of the invention. However, a type of the electronic apparatus is not specifically limited as long as the electronic apparatus is mounted with an acceleration sensor and includes recording means accessed by a head.

As the electronic apparatus according to the embodiment of the invention, a cellular phone, a portable or stationary video reproducing apparatus, and the like may be applied other than the portable music player.

In the embodiment described above, the acceleration data ACC and the temperature data TEMP are written in the memory 2 as the detection data when the predetermined conditions defined in advance are satisfied. However, these data may typically be written in the memory 2.

In the embodiment described above, the acceleration data ACC and the temperature data TEMP are written in the memory 2 as the detection data in association with the time data TIME. However, the time data TIME does not always have to be written in the memory 2.

In the embodiment described above, the control unit 14 writes the acceleration data ACC and the temperature data TEMP in the memory 2. However, a state occurring in the portable music player 1, for example, a state in which the portable player 1 has dropped or temperature in the housing of the portable player 1 is higher than the predetermined temperature may be detected and data indicating the state detected may be written in the memory 2.

It should be understood by those skilled in the art that various modifications, combinations, sub-combinations, and alterations may occur depending on design requirements and other factors insofar as they are within the scope of the appended claims or the equivalents thereof.

What is claimed is:

1. An electronic apparatus, comprising:
    a recording unit configured to access a recording medium using a head;
    an acceleration sensor that detects acceleration generated in the electronic apparatus; and
    a control unit configured to write, in the recording medium or a predetermined memory, detection data indicating a result of the detection by the acceleration sensor or a state of the electronic apparatus detected on the basis of the detection result only after the detection result satisfies a drop condition for the electronic apparatus defined in advance and retract the head of the recording unit to a predetermined retraction position.

2. An electronic apparatus according to claim 1, further comprising:
    a timer, wherein the control unit writes the detection data in the recording medium or the predetermined memory in association with a count value of the timer at a time when the detection data is generated.

3. An electronic apparatus according to claim 1, wherein the control unit writes, on the basis of the detection result of the acceleration sensor, the detection data in the recording medium or the predetermined memory when acceleration associated with a state that causes failure of the electronic apparatus is generated in the electronic apparatus.

4. An electronic apparatus according to claim 3, wherein the control unit writes, on the basis of the detection result of the acceleration sensor, the detection data in the recording medium or the predetermined memory when the acceleration generated in the electronic apparatus exceeds a predetermined level.

5. An electronic apparatus according to claim 4, wherein
    the acceleration sensor detects accelerations in three axial directions, and
    the control unit writes the detection data in the recording medium or the predetermined memory when at least acceleration in one axial direction among the accelerations in the three axial directions detected by the acceleration sensor exceeds the predetermined level.

6. An electronic apparatus according to claim 4, wherein the control unit lowers, when the head is accessing the recording medium in the recording unit, the predetermined level compared with that at a time when the head is not accessing the recording medium.

7. An electronic apparatus according to claim 1, further comprising:
    a temperature sensor, wherein the control unit writes, in the recording medium or the predetermined memory, data indicating a detection result of the temperature sensor or a state of the electronic apparatus specified on the basis of the detection result of the temperature sensor.

8. An electronic apparatus control method for controlling a portable electronic apparatus including recording means for accessing a recording medium using a head and an acceleration sensor that detects acceleration, the electronic apparatus control method comprising:
    generating detection data indicating a result of the detection by the acceleration sensor or a state of the electronic apparatus detected on the basis of the detection result;
    writing the detection data generated by the generating detection data in the recording medium or a predetermined memory only after the detection result satisfies a drop condition for the electronic apparatus; and
    retracting the head of the recording means to a predetermined retraction position.

9. An electronic apparatus control method according to claim 8, wherein
    the electronic apparatus further includes a timer, and
    the writing the detection data in the recording medium or the predetermined memory includes writing the detection data in the recording medium or the predetermined memory in association with a count value of the timer at a time when the detection data is generated.

10. An electronic apparatus control method according to claim 8, wherein, in the electronic apparatus, the writing the detection data in the recording medium or the predetermined memory includes writing, on the basis of the detection result of the acceleration sensor, the detection data in the recording medium or the predetermined memory when acceleration associated with a state that causes failure of the electronic apparatus is generated in the electronic apparatus.

11. An electronic apparatus control method according to claim 10, wherein, in the electronic apparatus, on the basis of the detection result of the acceleration sensor, the detection data is written in the recording medium or the predetermined memory when the acceleration generated in the electronic apparatus exceeds a predetermined level.

12. An electronic apparatus control method according to claim 11, wherein
    the acceleration sensor detects accelerations in three axial directions, and
    the retracting the head of the recording means includes writing the detection data in the recording medium or the predetermined memory when at least acceleration in one axial direction among the accelerations in the three axial directions detected by the acceleration sensor exceeds the predetermined level.

13. An electronic apparatus control method according to claim 11, further comprising:
lowering, when the head is accessing the recording medium in the recording means, the predetermined level compared with that at a time when the head is not accessing the recording medium.

14. An electronic apparatus control method according to claim 8, further comprising:
detecting a temperature of the electronic apparatus via a temperature sensor, and
the writing the detection data in the recording medium or the predetermined memory includes writing data indicating a detection result of the temperature sensor or a state of the electronic apparatus specified on the basis of the detection result in the recording medium or the predetermined memory of the temperature sensor.

15. An electronic apparatus according to claim 1, wherein the control unit does not write the detection data unless the drop condition is satisfied.

16. An electronic apparatus according to claim 1, wherein the detection data includes acceleration data for a predetermined period, and
the control unit only stores maximum acceleration data from the acceleration data.

17. An electronic apparatus according to claim 1, wherein the control unit stores the detection data for a plurality of drop conditions.

18. An electronic apparatus according to claim 1, further comprising:
a display, and the control unit outputs the detection data for the plurality of drop conditions on the display.

19. An electronic apparatus control method according to claim 8, wherein the writing the detection data includes writing acceleration data for a predetermined period and storing only maximum acceleration data from the acceleration data.

20. An electronic apparatus control method according to claim 8, further comprising:
displaying on a display the detection data for a plurality of drop conditions.

\* \* \* \* \*